(12) United States Patent
Martin et al.

(10) Patent No.: US 12,549,056 B2
(45) Date of Patent: Feb. 10, 2026

(54) ELECTRIC MACHINE FRAME FASTENERLESS COVERS

(71) Applicant: ABB Schweiz AG, Baden (CH)

(72) Inventors: William E. Martin, Greenville, SC (US); John M. Zedek, Simpsonville, SC (US)

(73) Assignee: ABB Schweiz AG, Baden (CH)

(*) Notice: Subject to any disclaimer, the term of this patent is extended or adjusted under 35 U.S.C. 154(b) by 270 days.

(21) Appl. No.: 18/185,965

(22) Filed: Mar. 17, 2023

(65) Prior Publication Data

US 2024/0313607 A1    Sep. 19, 2024

(51) Int. Cl.
| | |
|---|---|
| H02K 9/14 | (2006.01) |
| H02K 1/18 | (2006.01) |
| H02K 5/04 | (2006.01) |
| H02K 5/18 | (2006.01) |
| H02K 5/20 | (2006.01) |
| H02K 9/04 | (2006.01) |
| H02K 15/14 | (2025.01) |

(52) U.S. Cl.
CPC .............. *H02K 5/04* (2013.01); *H02K 5/18* (2013.01); *H02K 9/14* (2013.01); *H02K 1/185* (2013.01); *H02K 5/20* (2013.01); *H02K 9/04* (2013.01); *H02K 15/14* (2013.01)

(58) Field of Classification Search
CPC ............ H02K 5/18; H02K 9/14; H02K 1/185; H02K 15/14
USPC ......................................................... 310/89
See application file for complete search history.

(56) References Cited

U.S. PATENT DOCUMENTS

| | | | | |
|---|---|---|---|---|
| 3,461,328 | A * | 8/1969 | Drouard | H02K 5/207 310/59 |
| 3,824,419 | A * | 7/1974 | Skrzypczyk | H02K 5/22 220/819 |
| 5,008,572 | A * | 4/1991 | Marshall | H02K 15/16 310/90 |
| 7,808,136 | B2 | 10/2010 | Knauff | |
| 2004/0000821 | A1 * | 1/2004 | Ciciliani | H02K 9/04 310/58 |

(Continued)

FOREIGN PATENT DOCUMENTS

| | | | |
|---|---|---|---|
| EP | 3070815 A1 | 9/2016 | |
| EP | 3637595 A1 * | 4/2020 | ............... H02K 5/18 |

(Continued)

OTHER PUBLICATIONS

Translation of JP H11299174 A (Year: 1999).*

(Continued)

*Primary Examiner* — Oluseye Iwarere
*Assistant Examiner* — Daniel K Schlak
(74) *Attorney, Agent, or Firm* — Fitch Even Tabin & Flannery LLP

(57) ABSTRACT

An electric machine includes: a stator with an outer and an inner surface; a rotor disposed inside the inner surface of the stator and configured to rotate about an axis of rotation; a shaft oriented along and configured to rotate about the axis of rotation of the rotor and operably connected to the rotor; a frame integrated with the stator such that an outer surface of the frame is identical to the outer surface of the stator or a frame disposed outside the stator; and at least one fastenerless cover fixed to the outer surface of the frame without the use of fasteners.

18 Claims, 11 Drawing Sheets

(56) References Cited

U.S. PATENT DOCUMENTS

2023/0034953 A1* 2/2023 Martin .................. H02K 1/185

FOREIGN PATENT DOCUMENTS

| EP | 4125183 A1 | | 2/2023 | | |
|----|------------|---|--------|---|---|
| JP | H11299174 A | * | 10/1999 | .............. | H02K 9/04 |
| JP | 2012231597 A | * | 11/2012 | .............. | H02K 5/04 |
| JP | 2020145834 A | * | 9/2020 | .............. | H02K 5/20 |

OTHER PUBLICATIONS

Translation of JP 2020145834 A (Year: 2020).*
Translation of JP 2012231597 A (Year: 2012).*
European Patent Office, Extended European Search Report in European Patent Application No. 24163965.7, 10 pp. (Sep. 11, 2024).

* cited by examiner

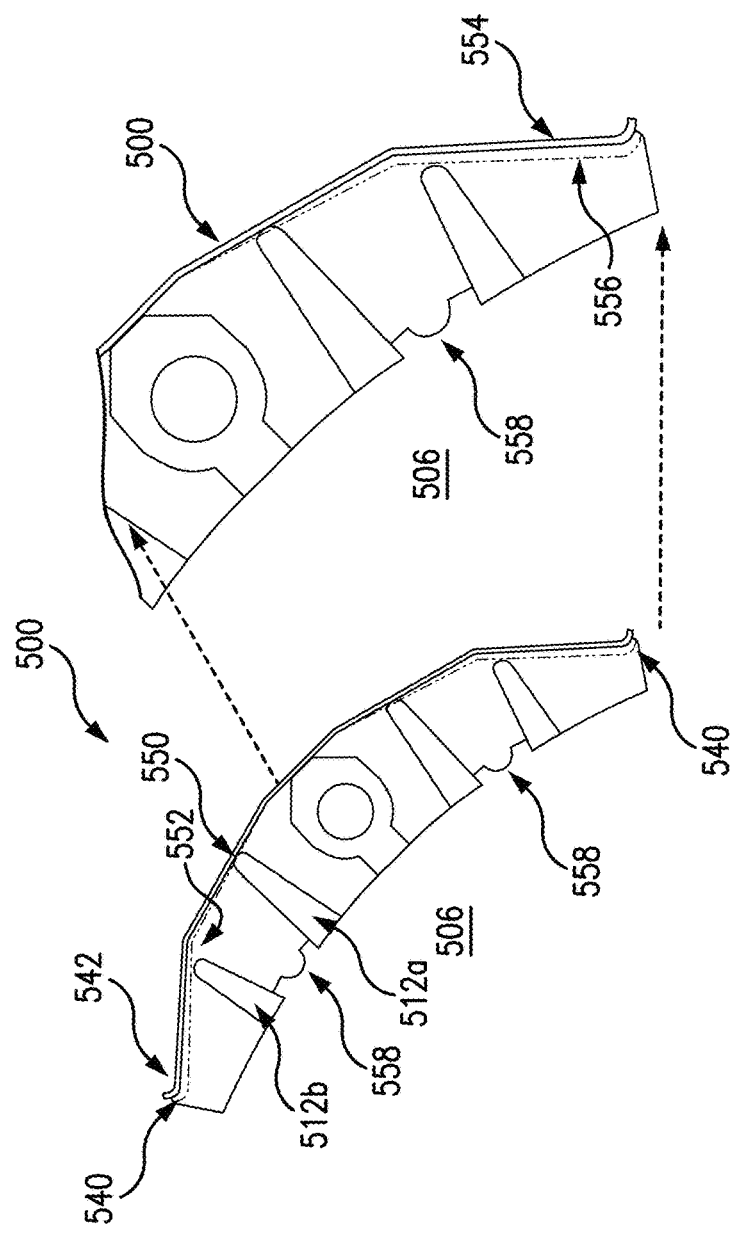
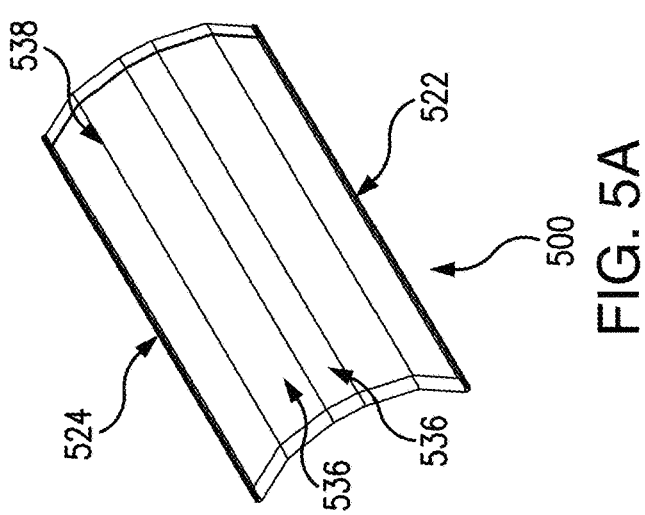
FIG. 5A
FIG. 5B

ELECTRIC MACHINE FRAME FASTENERLESS COVERS

BACKGROUND

Electric machines are used to convert mechanical energy to electrical energy (electric generators) and to convert electrical energy to mechanical energy (electric motors). With these electric machines, the mechanical energy is often in the form of rotational kinetic energy found in the rotation of a shaft. The shaft can be oriented along an axis of rotation of a rotor and operably connected to the rotor so that the shaft and the rotor rotate synchronously. The rotor is disposed in an inner opening in the stator. In some cases the stator will have a mirror symmetry about the axis of rotation of the rotor.

As a byproduct of converting one form of energy to another, electric machines produce heat. Various systems have been developed to remove this heat from the electric machines, including some systems that conform to industry standards. Standards for electric machines have been established by such organizations as the National Electrical Manufacturers Association (NEMA) and the International Electrotechnical Commission (IEC). For example, NEMA standards define several electric motor enclosure types, including Open Drip-Proof (ODP), Totally Enclosed Fan Cooled (TEFC), and Totally Enclosed Water Cooled (TEWC). These standards help ensure interoperability of electric machines produced by different manufacturers. In order to produce electric machines to different standards for different applications, manufacturers may need to produce different parts using different tools for each type of electric machine. The need for multiple parts and tools can create inefficiencies that can drive up manufacturing costs.

SUMMARY

One or more aspects of the disclosure provides an electric machine that includes: a stator with an outer and an inner surface; a rotor disposed inside the inner surface of the stator and configured to rotate about an axis of rotation; a shaft oriented along and configured to rotate about the axis of rotation of the rotor and operably connected to the rotor; a frame integrated with the stator such that an outer surface of the frame is identical to the outer surface of the stator or a frame disposed outside the stator; and at least one fastenerless cover fixed to the outer surface of the frame without the use of fasteners.

One or more aspects of the disclosure provides a fastenerless cover for covering a portion of an outer surface of a frame of an electric motor. The cover includes a sheet of material. The sheet includes: an arc shape extending in a first direction from a first edge to a second edge and having a concavity in a second direction extending through an axis of rotation of the electric motor, the first and second edges substantially parallel to the axis of rotation, the first direction, the second direction, and the axis of rotation being mutually orthogonal; a length in the direction of the axis of rotation; and first and second lips along the first and second edges, respectively, each lip configured to engage a respective complementary frame hook disposed on the outer surface of the stator to fix the fastenerless cover to the outer surface of the stator; the sheet being at least partially elastically deformable in the first direction, allowing the separation between the first and second edges to be temporarily increased or decreased while fixing the fastenerless cover onto the frame. A restoring force of the deformed sheet secures, without the use of fasteners, the cover on the outer surface of the frame.

BRIEF DESCRIPTION OF THE DRAWINGS

FIG. 5A provides a perspective view of a fastenerless cover of an electric motor in accordance with one or more aspects of the present disclosure.

FIG. 5B provides contrasting cross sectional of views of a fastenerless cover as bent in a rested position and as installed on the outer surface of a stator-frame in accordance with one or more aspects of the present disclosure.

DETAILED DESCRIPTION

Electric machines that include rotating parts typically include a stator, a rotor, and a shaft. Additionally, a frame, or housing, can be included as can a cooling system. The frame may be disposed outside the stator or the frame may be integrated with the stator to form a stator-frame. As used herein, discussions of frames and stator-frames apply interchangeably to each unless explicitly noted or clear from the context. Similarly, references to stators can apply to stator-frames unless explicitly noted or clear from the context. The stator can have a number of windings of electrically insulated wire to produce a time-varying magnetic field. The rotor can be operatively coupled to the shaft, the rotor and the shaft being rotatable about a common axis of rotation. The rotor can include permanent magnets or other electrically insulated wire wound on the rotor that can produce a magnetic field that rotates as part of the rotor. The stator is designed with an interior area capable of receiving the rotor and the shaft. In the case of an electric generator, the shaft is mechanically driven, the concomitant rotation of the magnetic field produced by the rotor will induce an alternating current in the windings of the stator. Conversely, an electric motor receives an alternating current in the winding of the stator that produces a rotational force on the shaft.

Figure 1:
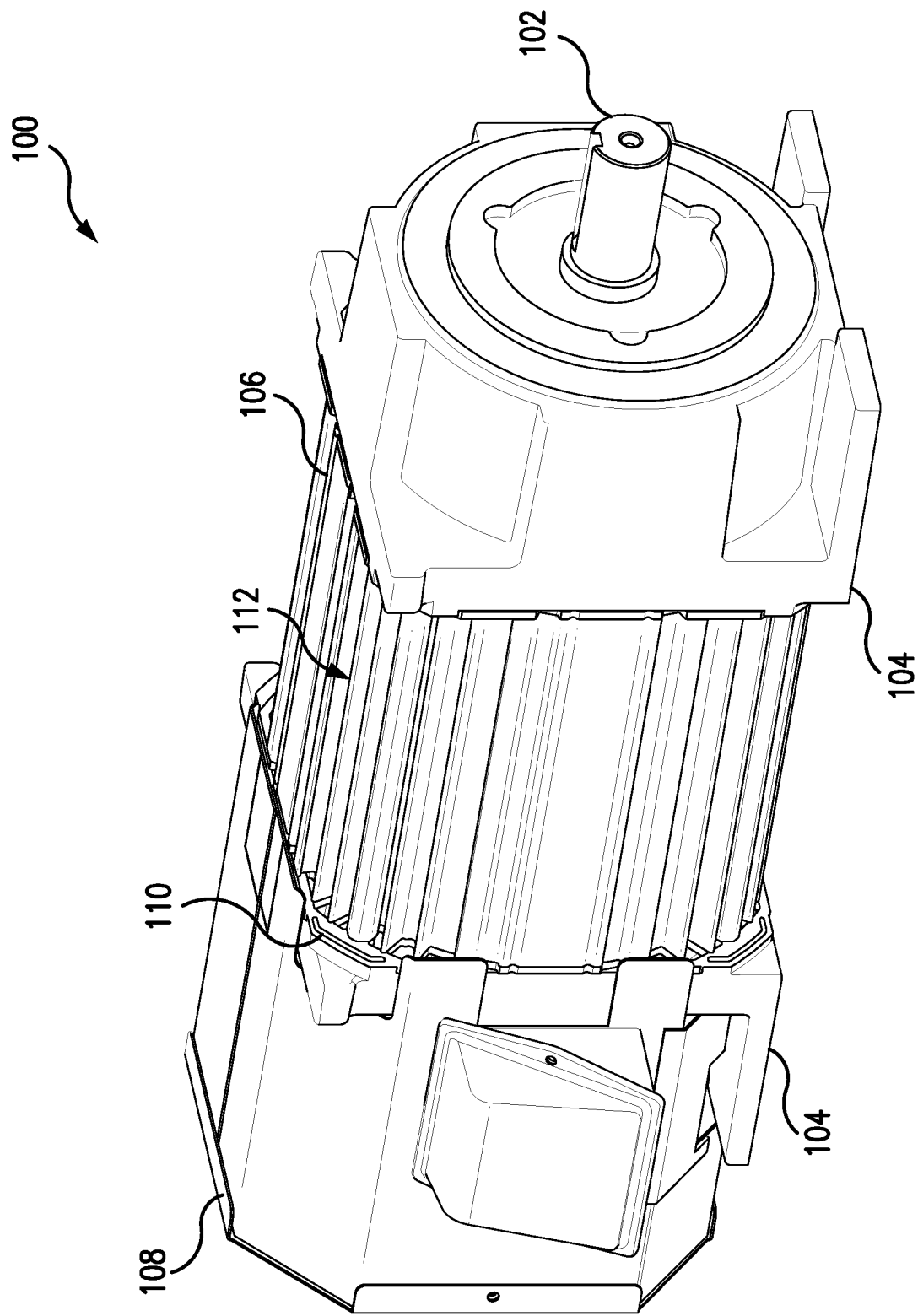
FIG. 1 provides a perspective view of an electric motor with totally enclosed fan cooling in accordance with one or more aspects of the present disclosure.

FIG. 1 depicts an electric motor 100 with totally enclosed fan cooling (TEFC). The electric motor 100 converts electrical energy into mechanical energy that rotates shaft 102. Different endplates 104 are attached to the stator lamination assembly 106. Heat generated by the electric motor 100 can be removed by a fan (not shown) mounted to an endplate 104 and enclosed in a shroud (or fan housing) 108. The fan blows out holes 110 and across fins 112 on the outer surface of the stator lamination assembly 106. Given that the fins 112 are exposed, dirt and debris settling on the fins may reduce the efficiency of removing heat from the electric motor 100.

Figure 2:
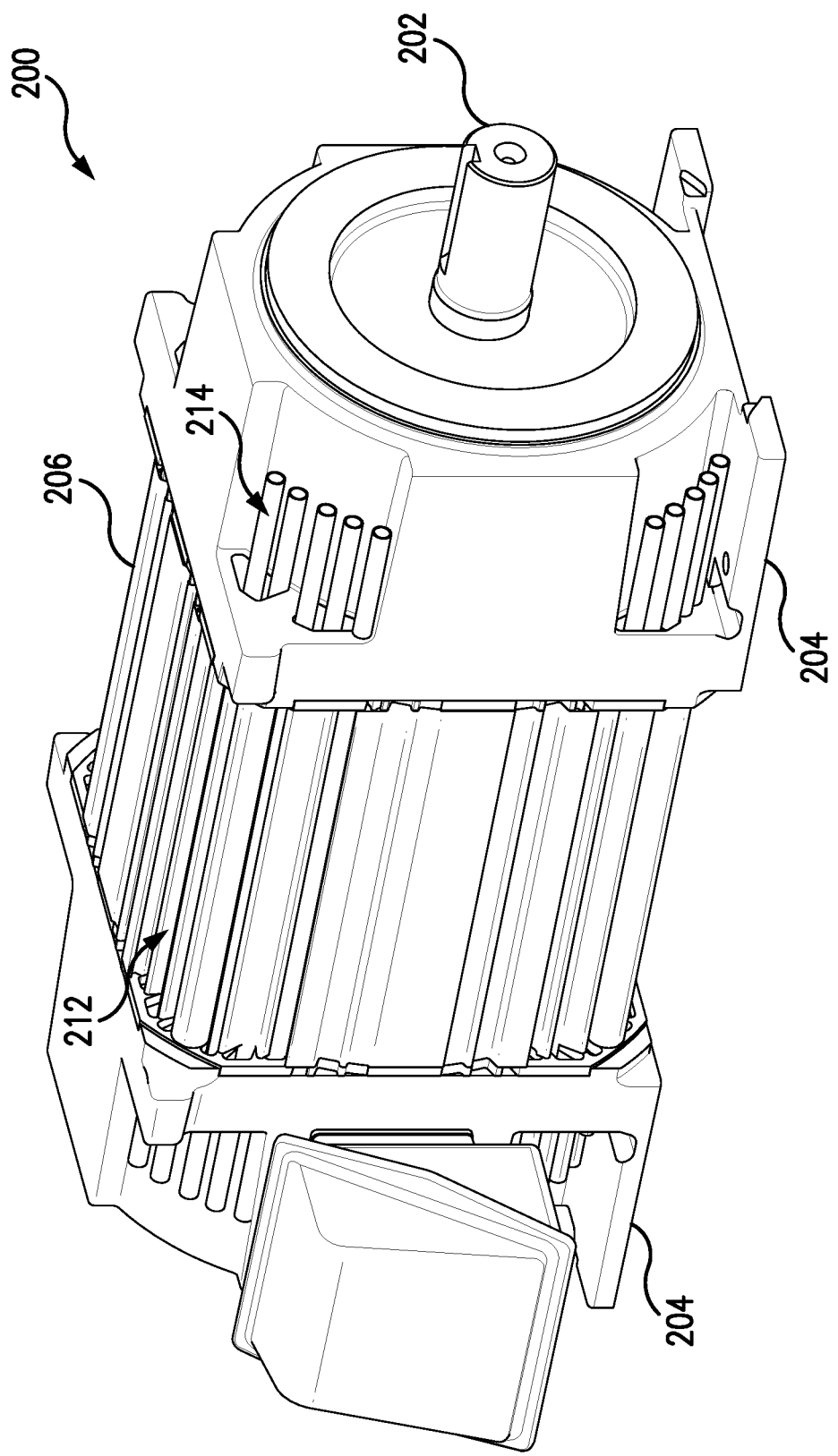
FIG. 2 provides a perspective view of an electric motor with totally enclosed water cooling in accordance with one or more aspects of the present disclosure.

FIG. 2 depicts a similar electric motor 200, though cooling is totally enclosed water cooling (TEWC). Similar features from FIG. 1 include shaft 202, endplates 204, stator lamination assembly 206, and fins 212. Cooling to the electric motor 200 is provided by a plurality of water pipes 214 that pass near or through the fins 212.

Figure 3:
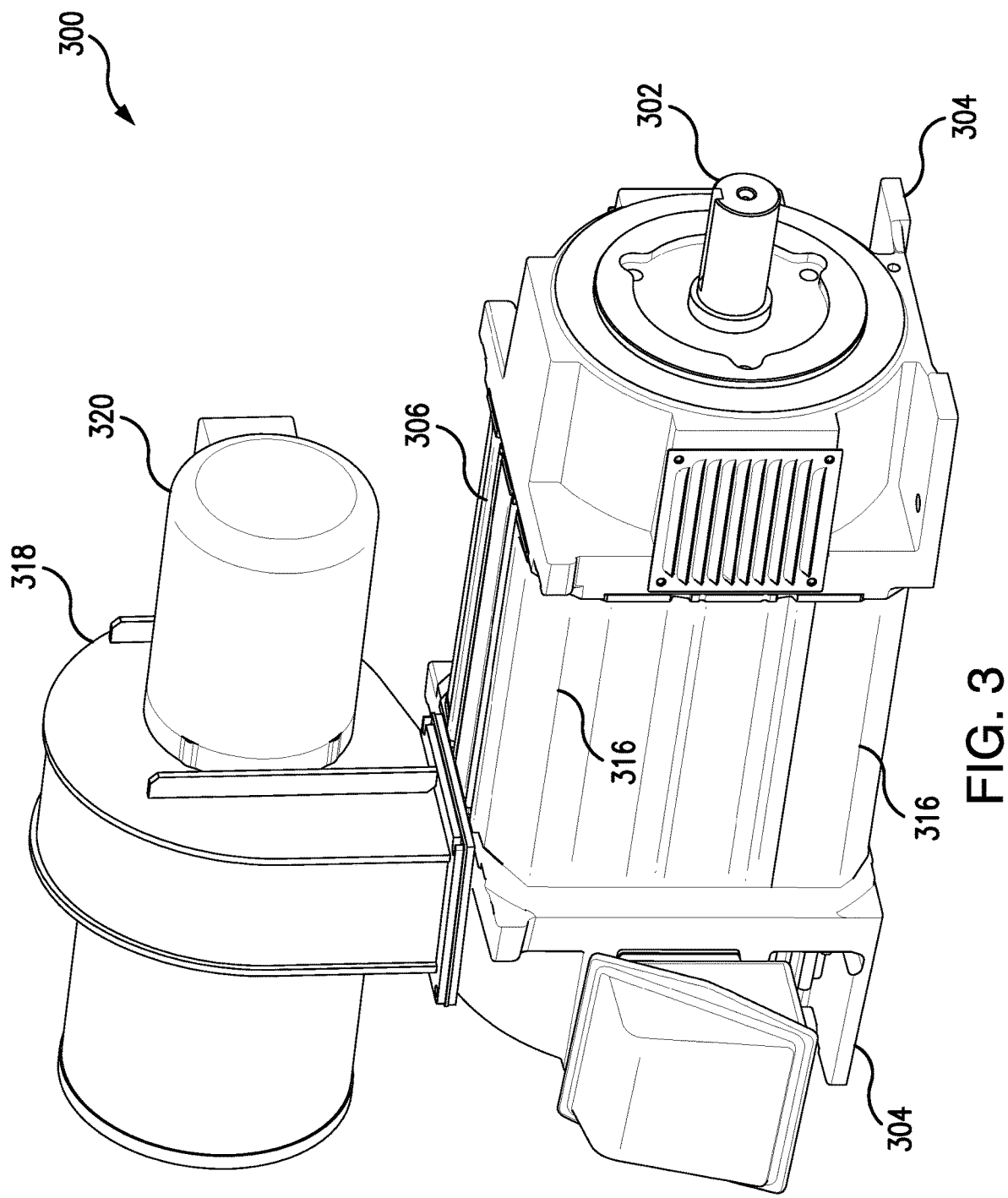
FIG. 3 provides a perspective view of an electric motor with open drip-proof cooling in accordance with one or more aspects of the present disclosure.

FIG. 3 depicts an electric motor 300 cooled with an open drip-proof (ODP) cooling system. Features similar to electric motors 100, 200 include shaft 302, endplates 304, and stator lamination assembly 306. Fins, visible in the first two motors 100, 200, are covered for electric motor 300 with corner covers 316. Cooling is provided by blower 318, which is powered by electric blower motor 320. In this cooling scheme, air is blown between the corner covers 316 and the fins (not visible) on the outer surface of the stator lamination assembly 306. The space between each corner cover 316 and the outer surface of the stator lamination assembly 306 effectively form a duct for air to blow through and remove heat from the electric motor 300.

The outer surface of a stator-frame (or stator lamination assembly) can be designed to allow the stator and the electric machine with which the stator is associated to function in at least two of ODP, TEFC, and TEWC modes. To vary between ODP and TEFC, a cover, typically mounted at one or more corners or the stator-frame (or frame) outer surface, must be added (ODP) or removed (TEFC). The ability to use the same stator-frame (or frame) for multiple functions can lead to increased manufacturing efficiency and lowered costs. The ability to add or remove a corner cover enables this multifunctionality. The ability to add or remove the cover manually, and particularly without the use of tools, can improve efficiency for the installer and/or operator of the electric machine.

Figure 4:
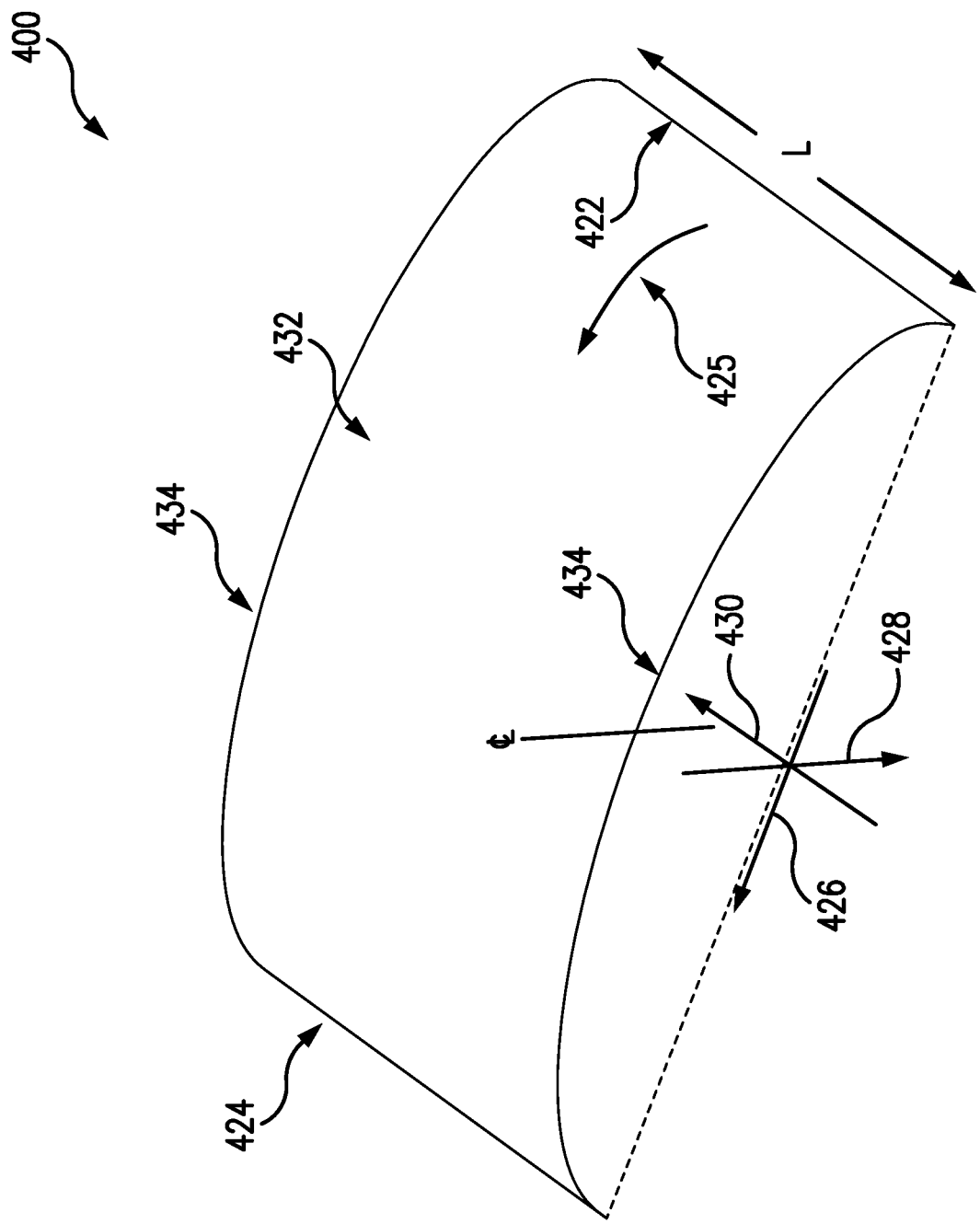
FIG. 4 provides a perspective view of an arc-shaped fastenerless cover of an electric motor in accordance with one or more aspects of the present disclosure.

FIG. 4 depicts a fastenerless cover 400 for covering a portion of an outer surface of a stator-frame or stator-frame lamination assembly. For example, the fastenerless cover 400 may be used as a corner cover. The cover 400 is arc shaped and extends from a first edge 422 to a second edge 424. An arc-wise direction 425 is defined to follow the arc shaped surface of the cover 400 from the first edge 422 to the second edge 424. Further, a first direction 426 is defined from the first edge 422 to second edge 424. A second direction 428 is oriented to pass through the axis of rotation of the shaft of the electric motor. The direction 430 of the axis of rotation of the shaft is shown here displaced but parallel to the axis of rotation. These three directions, the first direction 426, the second direction 428, and the direction 430 of the axis of rotation of the shaft are mutually orthogonal. The first and second edges 422, 424 are substantially parallel to the direction 430 of the axis of rotation. The centerline (₵) defines a line about which the cover 400 possesses mirror symmetry. Although not shown in this view, the first and second edges 422, 424 have lips that are used to fasten the cover 400 to the outer surface of the stator-frame (or stator lamination assembly) without the use of fasteners. The cover has a length (L) in the direction of the axis of rotation (that it, the axial direction of the electric motor). The cover 400 includes a sheet 432 of material. This sheet 432 may comprise metal, plastic, composite material, or similar material. The sheet 432 may be coated with such materials as in a heat-resistant elastomeric material such as neoprene rubber. In other embodiments, the edges of sheet 432 except the first and second edges 422, 424 may be provided with a sealant. The sealant may fully, substantially, or partially prevent airflow between outside the cover and under the cover. in one or more embodiments, the sealant may be a trim that is applied before the cover is attached to the frame. The sealant may be rubber, epoxy, silicone, paint, some other suitable material, or a combination of these materials. The sealant may include other materials as well.

FIG. 5A shows an aspect of the fastenerless cover 500 where the arc shape of the cover is comprised of a plurality of flat sections 536 joined by discrete bends 538 in the cover. The arc shape of the cover 500 extends from first edge 522 to second edge 524. The cover 500 as shown in this non-limiting includes five flat sections 536 of varying dimensions.

FIG. 5B presents a cross section view of the cover 500 and an outer surface of stator-frame 506, to which the cover may be attached without the use of fasteners. The first and second edge 522, 524 each have a lip 540 that is configured to clip to a respective complementary frame hook 542 on the outer surface of the stator-frame 506 and hold the fastenerless cover 500 in place.

The expanded view of the fastenerless cover 500 and the outer surface of the stator-frame 506 provides a view of two states of the cover. In a first view 554, the as-bent fastenerless cover 500 is in a rested position. In a second view 556, the fastenerless cover 500 is shown in outline form. In this second view 556, the fastenerless cover 500 is installed on the outer surface of the stator-frame 506 and is elastically deflected into a complementary frame hook 542 and locked in position without the use of a fastener.

Still referring to FIG. 5B, the stator-frame 506 includes a plurality of fins 512, which may play a role in removing heat from the stator and the related electric machine. An individual fin 512 may or may not be in direct contact with fastenerless cover 500. In FIG. 5B, fin 512a makes contact with the cover 500 at point 550 while fin 512b does not make contact with cover 500, creating a gap 552. In this case, fin 512b is proximate to one of two lips 540 of the cover. The cover 500 requires room to deform so that lip 540 may engage with complementary frame hook 542 of the stator-frame 506 to fasten the cover to the outer surface of the stator-frame.

The outer surface of the stator-frame 506 may also include water pipe support structure 558 to hold and/or guide water pipes that may be used in TEWC cooling of the stator and the associated electric machine.

Figure 5C:
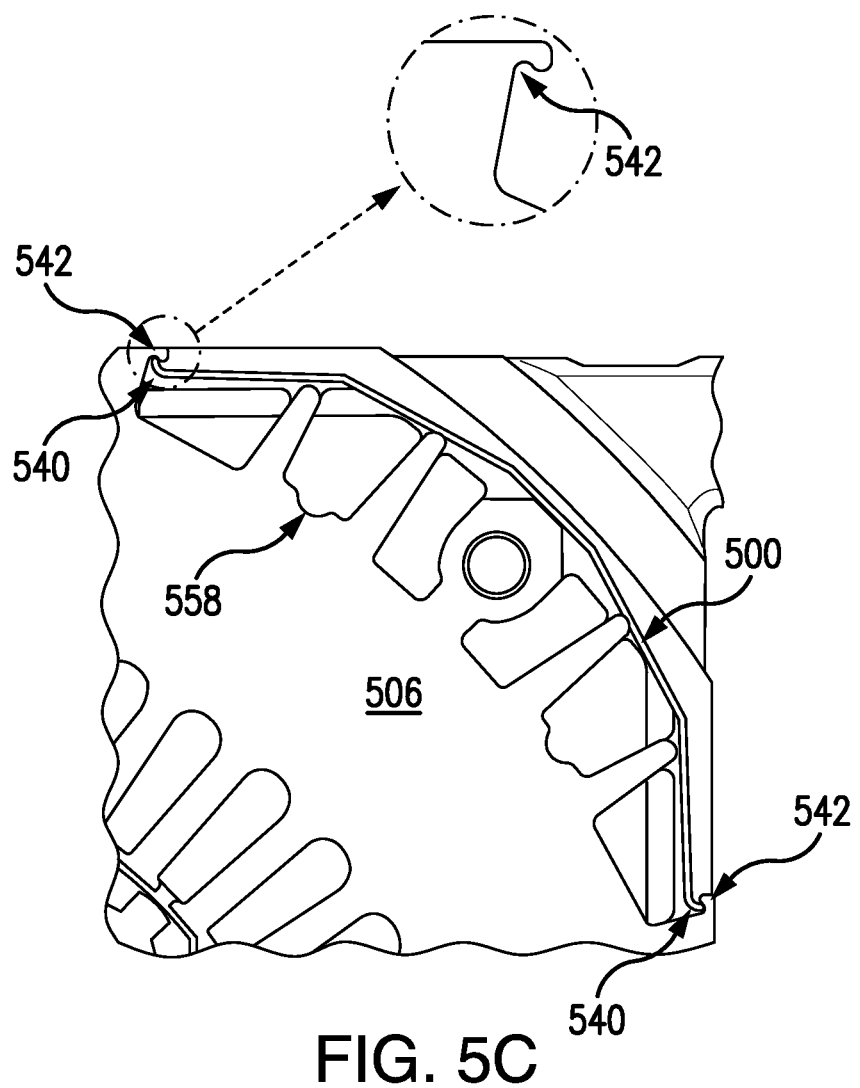
FIG. 5C provides of cross sectional view of a fastenerless cover installed on the outer surface of a stator-frame in accordance with one or more aspects of the present disclosure.

FIG. 5C depicts fastenerless cover 500 installed on the outer surface of a stator-frame 506. The first and second ends of the cover 500 each include a lip 540 that latches onto a respective frame hook 542 to secure the cover to the stator-frame. An inset shows an enlarged view of a frame hook 542. Elastic deformation of the cover 500 allows the cover to be securely latched to the stator-frame 506. In other words, by pressing the two lips 540 slightly closer together, each lip 540 will be able to securely engage the respective frame hooks 542. After this engagement, the force pressing the two lips 540 together may be removed and the residual elastic deformation of the fastenerless cover 500 will hold the cover securely in place on the outer surface of the stator-frame 506.

Figure 6A:
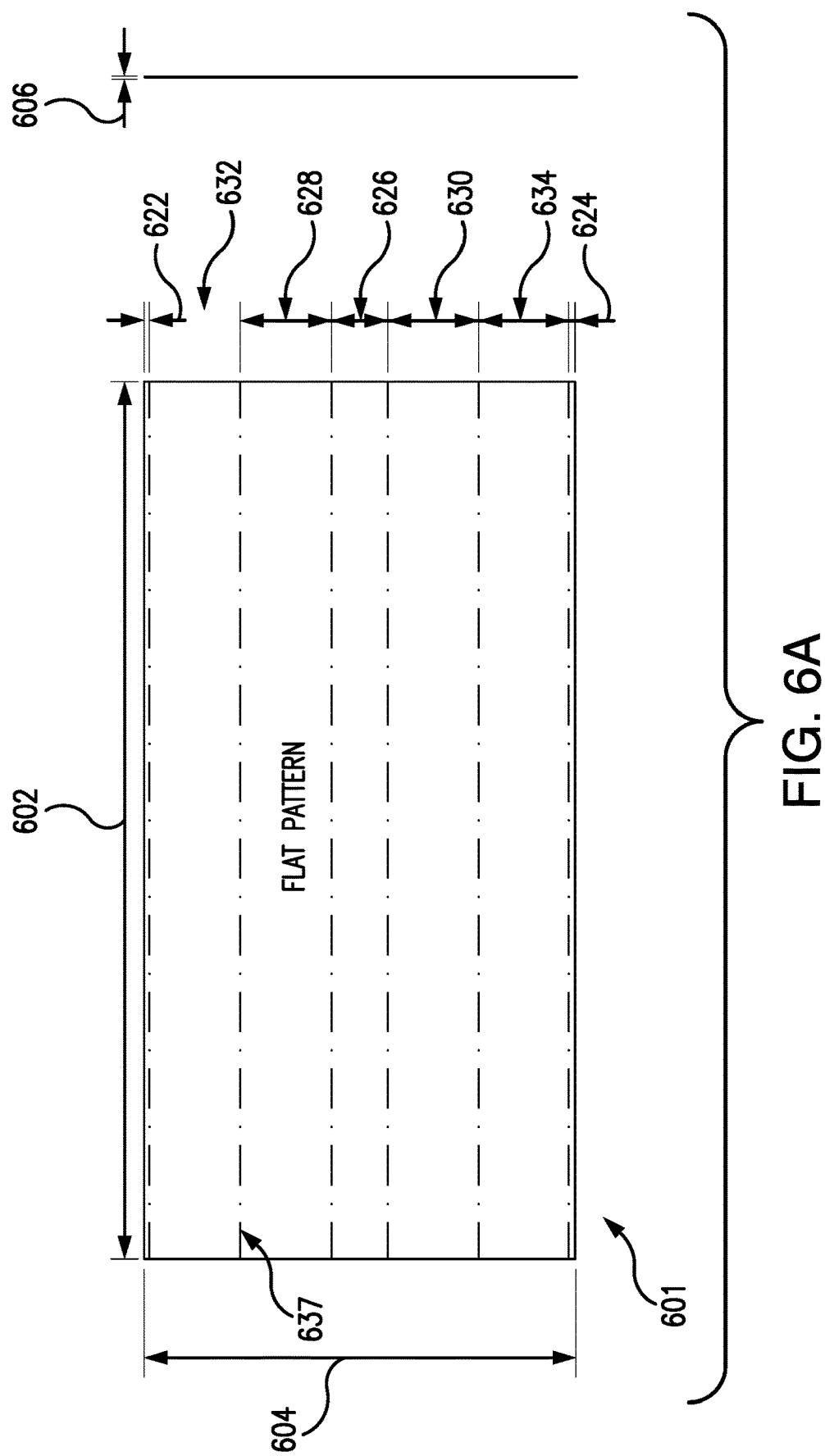
FIGS. 6A-6C provide combinations of perspective view, end view, and plan view of a fastenerless cover of an electric motor in accordance with one or more aspects of the present disclosure.
Figure 6B:
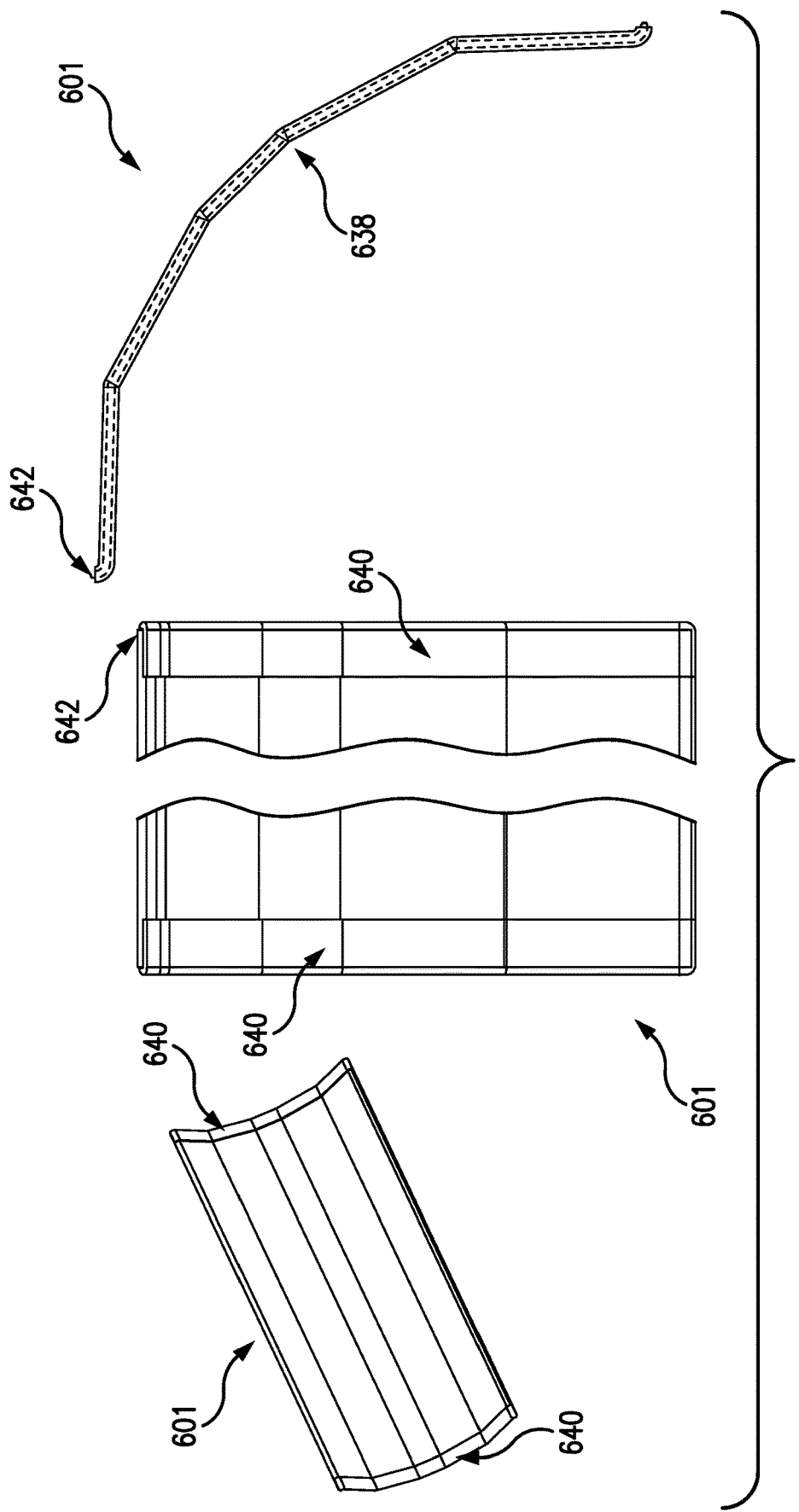
Figure 6C:
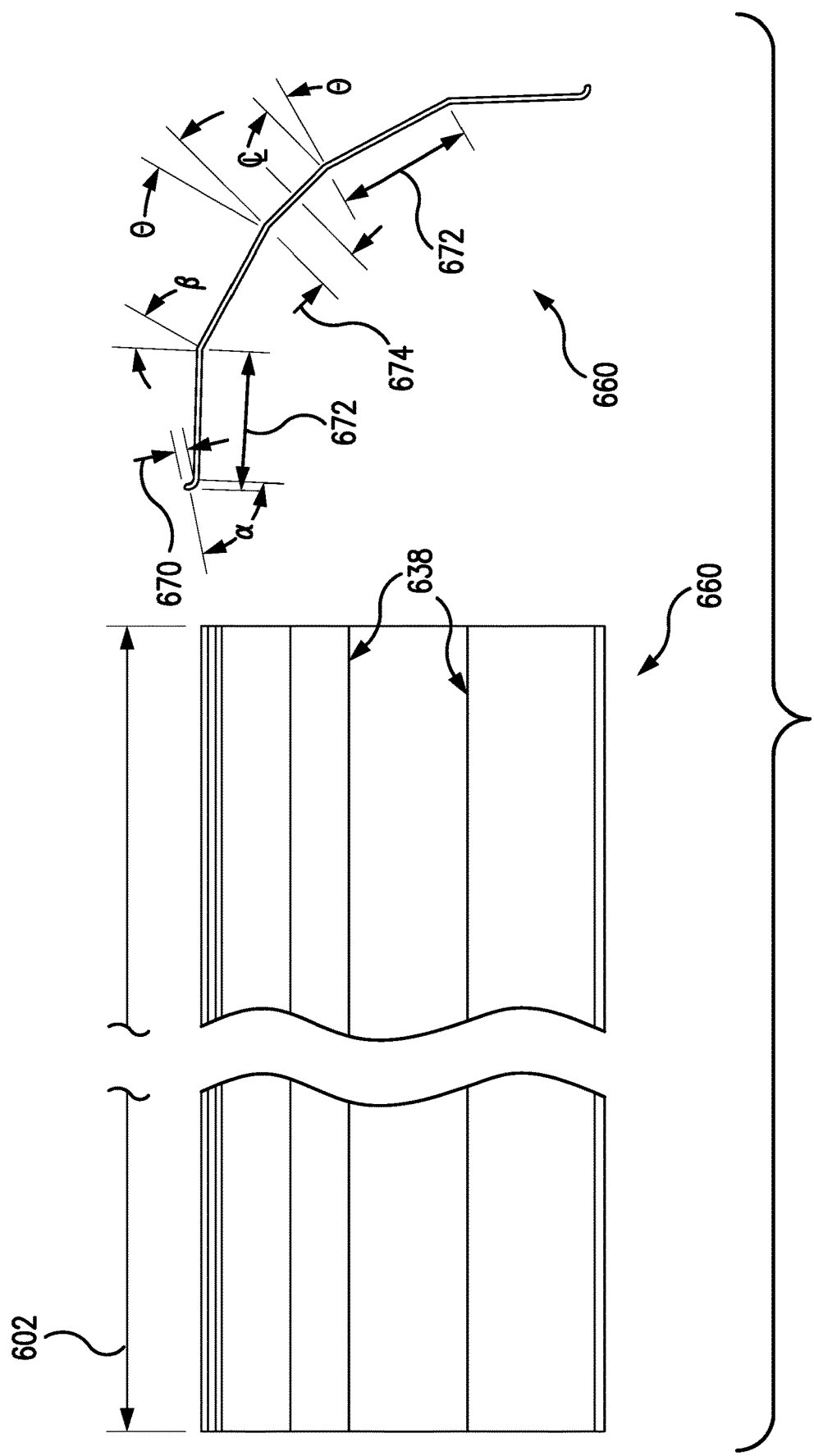

FIGS. 6A-6C display a plurality of exemplary though non-limiting views related to the manufacture of one or more embodiments of the fastenerless cover. FIG. 6A discloses a sheet 601 of material used to manufacture a cover. The sheet 601, for example, sheet metal, has a length 602, a width 604, and a thickness 606. The sheet 601 is seen in FIG. 6A at the beginning of manufacturing a fastenerless cover as essentially flat with break lines 637 running lengthwise along the sheet where discrete bends 638 will be made in the sheet 601 to provide a piecewise arc shape for the fastenerless cover as seen in FIG. 6B. At opposite ends of sheet 601 in the width direction, lips 622, 624 are formed. In one or more embodiments, the cover formed from sheet 601 possesses symmetry in the width direction. Thus, as shown in the example in FIG. 6B, mid-segment 626 is adjacent to segments 628 and 630, which are adjacent to segments 632 and 634, respectively. The dimensions of the sheet 601, including relative dimensions, may vary based on the size cover required for a particular electric machine. Non-limiting examples of dimensions include: for length 602, width 604, and thickness 606, 11.96 inches (in; 303.8 mm), 5.90 in (149.9 mm), and 0.04 in (1.0 mm), respectively. For mid-segment 626 and segments 628, 630, 0.77 in (19.6 mm) and 1.26 in (32.0 mm). For segments 632 and 634 and lips 622 and 624, 1.21 in (30.7 mm) and 0.10 in (2.5 mm), respectively. Manufacturing tolerances can be ±0.02 in (±0.5 mm).

Referring further to FIG. 6B, a sealant may be applied along the two widthwise edges of the bent sheet 601. As discussed above, the sealant may be a trim. The trim 640 may be U-shaped to cover a portion the top and bottom surfaces as well as the edge. The trim may be rubber, plastic, resin, or any other material suitable for covering the edges, or combination of suitable materials. In one or more embodiments, a styrene-butadiene (SBR) rubber may be used. The U-shaped trim 640 may have an inside width of $1/32$ in (0.8 mm) and an inside height of $5/32$ in (4.0 mm). Further the trim may have an outside width of $7/64$ in (2.8 mm) and an outside height of $7/32$ in (5.6 mm). The trim may have a medium hardness, for example a durometer 55A hardness. The working temperature range of the trim 640 may be 0° F. to 220° F. (−18° C. to 104° C.) and the trim may be considered very flexible.

In one or more embodiments, the trim may be pressed onto both widthwise edges of the bent sheet 601. There may also be $1/32$ in to $1/16$ in (0.8 mm to 1.6 mm) relief 642 of the trim 640 on all four edges of the bent sheet 601.

FIG. 6C displays the non-limiting dimensions of a fastenerless cover 660, including angles of each discrete bend 638. The total included angle in this non-limiting example is 84°, though other values may be used as well. As previously mentioned, the fastenerless cover 660 may be symmetric about a centerline (₵). The angles subtended in this example include α (alpha) 75°, β (beta) 27°, and θ (theta) 15°. In one or more embodiments, the tolerance on the angles may be ±30 arcminutes ('). Dimension may include lips 670 of 0.12 in (3.0 mm), segments 672 not crossing the centerline 1.25 in (31.8 mm) and a half-width 674 of the segment crossing the center line 0.38 in (9.7 mm). The tolerances may again be ±0.02 in (±0.5 mm) with the exception of the lips, which may have a tolerance of +0.00/−0.02 in (+0.0/−0.5 mm).

Figure 7:
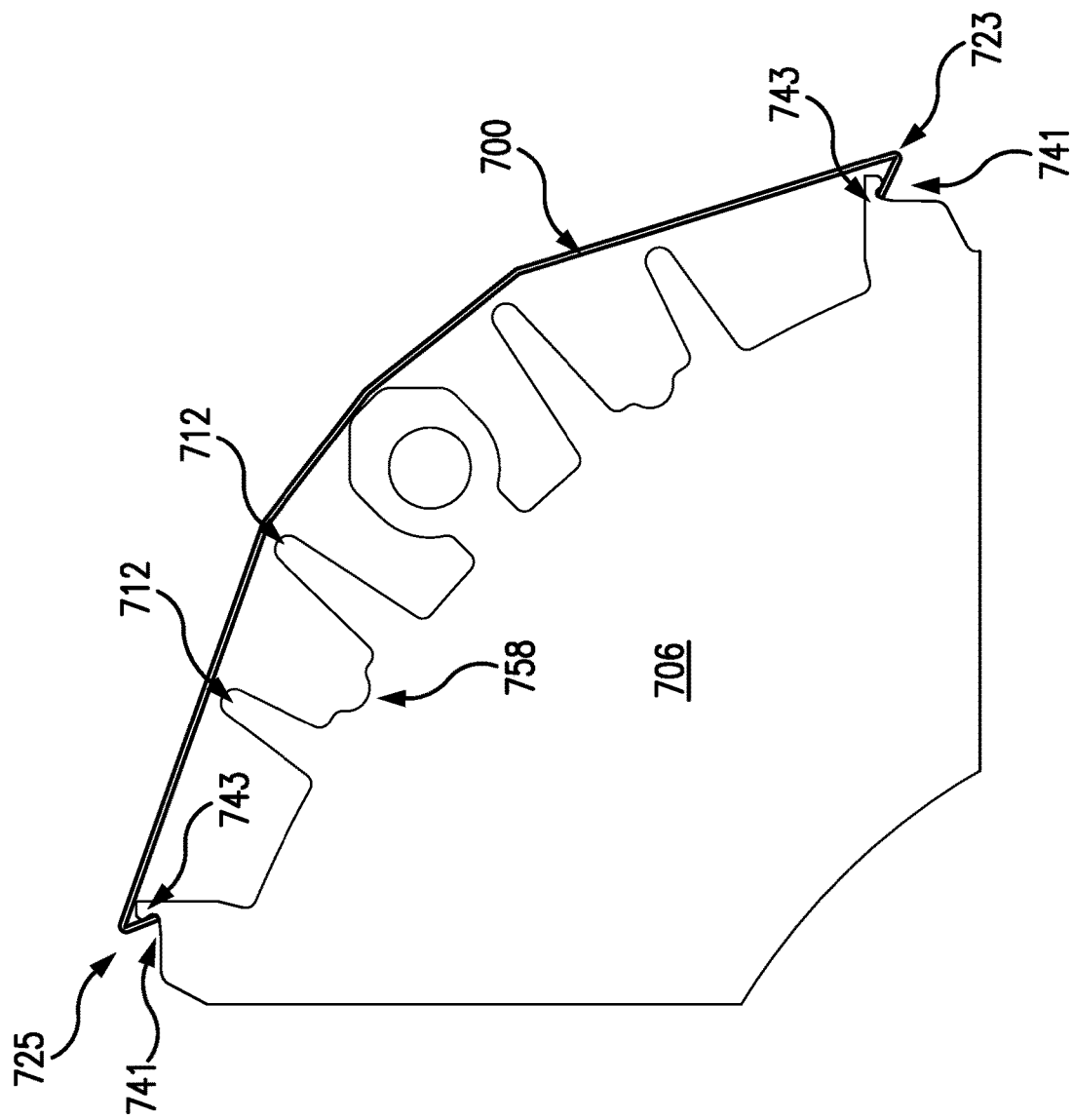
FIG. 7 provides a cross sectional view of a second aspect of a fastenerless cover disposed on an outer surface of a stator-frame in accordance with one or more aspects of the present disclosure.

FIG. 7 presents an alternate embodiment of a fastenerless cover 700 fixed on the outer surface of stator-frame 706, which may include fins 712 and water pipe support structure 758. In this non-limiting example, places lip 741 over the complementary frame hook 743, rather than under it as is done in an embodiment described above. Installation in this example requires increasing the distance between the first edge 723 and the second edge 725 of fastenerless cover 700. In other words, in this embodiment, force is applies to the cover 700 to elastically deform the cover by stretching the cover, increasing the distance between the first and second edges until the lips 741 associated with the first and second edges 723,725 have engaged the corresponding frame hooks 743. Once the engagement has been made, the stretching force applied to the cover may be removed and the residual elastic deformation of the fastenerless cover 700 will secure the cover 700 to the outer surface of the stator-frame 706.

Figure 8B:
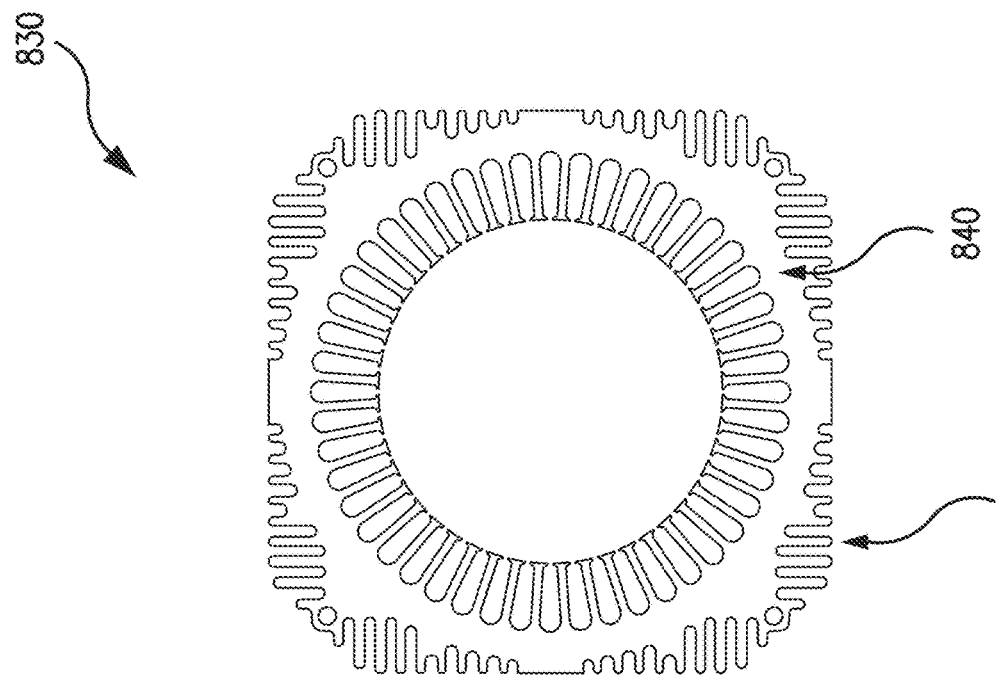
FIGS. 8A and 8B depict cross sectional views of a portion of an electric machine that includes a separate frame and a portion of an electric machine with stator and frame integrated into a stator-frame, respectively, in accordance with one or more aspects of the present disclosure.
Figure 8A:
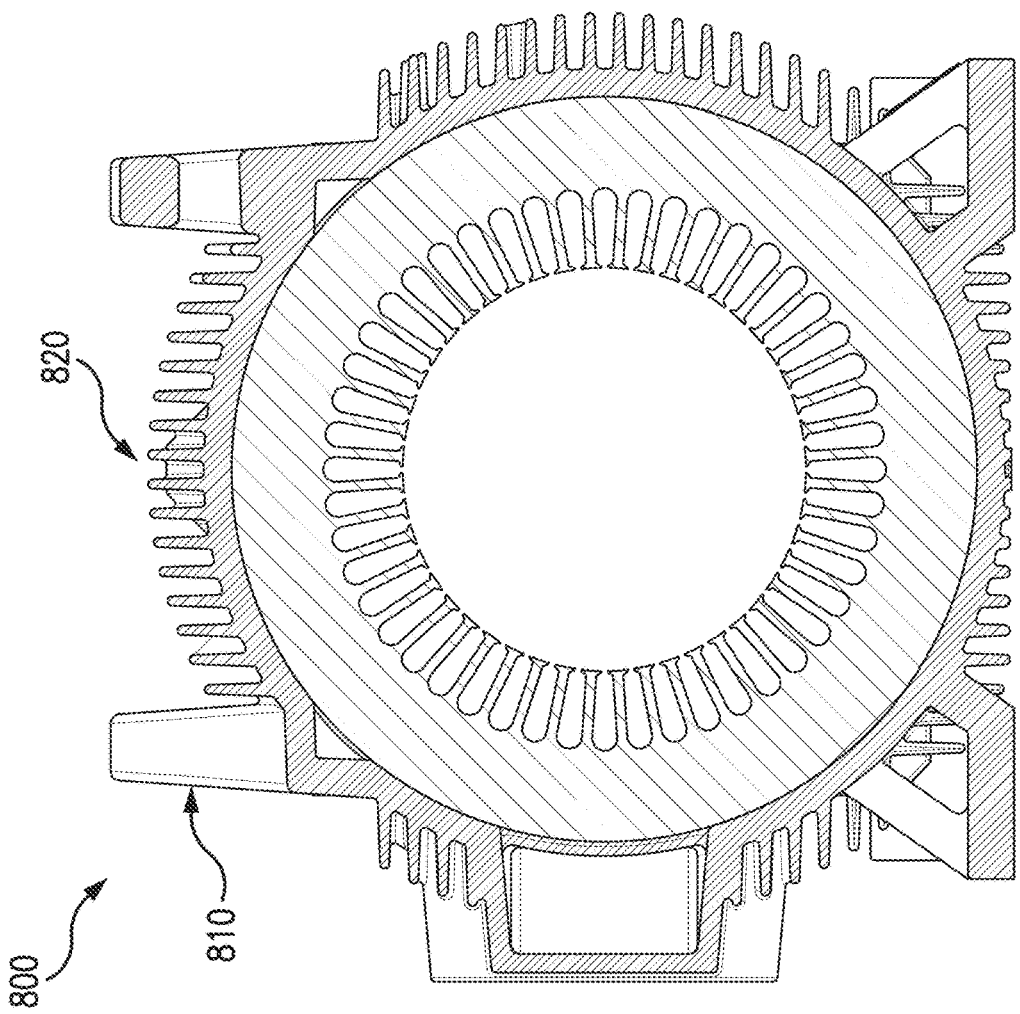

FIG. 8A presents a cross sectional view in the axial direction of a portion of an electric machine 800. The electric machine 800 includes a stator 805 disposed inside a frame 810. The frame 810 may include fins 820 that may be used for heat exchange among other purposes. In one or more embodiments, the frame 810 may include a plurality of separate parts.

FIG. 8B presents a cross section view in the axial direction of a portion of another electric machine 830 that combines a stator and a frame into an integrated stator-frame 840. The stator-frame 840 may include fins 850 that may be used for heat exchange among other purposes. In one or more embodiments, the stator-frame may include a series of laminations that are stacked in the axial direction (in other words, in the direction out of the page).

As used herein, the term "frame" may refer to either a stand-alone frame similar to the frame 810 presented in FIG. 8A or to a stator-frame similar to the stator-frame 840.

Further, figures and examples disclosed herein may apply to electric machines with separate stator and frame and to electric machines with an integrated stator-frame unless explicitly stated otherwise or apparent from context.

As used herein, the term "fasteners" includes, but is not limited to screws, bolts, rivets, adhesives, clamps, straps, or any other object or system of objects used to fix the position of at least one part of one object relative to at least one part of a second object.

A restoring force, as used herein, refers to a force that seeks to return an object, say a fastenerless cover, to its undeformed state. The undeformed state may be the state of the object after its manufacture. In other cases, it may refer to the state of the object just before installation. As an example, just before the distance between the first edge and a second edge of a fastenerless cover is either decreased or increased in order to install the cover on the outer surface of a stator (or stator lamination assembly), the cover is in an undeformed state. After the installation has taken place, a restoring force securely holds the cover in place on the outer surface of the stator.

A restoring force is found when an object undergoes elastic deformation. When the elastic limit is exceeded, the object will no longer return to its undeformed shape or state. Partially elastic deformation, as used herein, refers to the deformation of an object partial so that when the deforming force is removed, the object will partially return to its undeformed state. Classic restoring forces, such as that experienced by a spring, are understood to be linear in space. For example, the restoring force will double when the change in length of the spring doubles. There is no such assumption or requirement that restoring forces discussed herein are linear.

As used herein, "repeatedly removable" indicates that the object that is installed and then uninstalled or removed does not undergo, as a part of that cycle, any damage that would typically and inherently make the object, say a fastenerless cover, able to be used only once.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electric machine comprising:
   a stator comprising:
   an outer surface;
   an inner surface;
   a rotor disposed inside the inner surface of the stator and configured to rotate about an axis of rotation;
   a shaft oriented along and configured to rotate about the axis of rotation of the rotor and operably connected to the rotor;
   a frame integrated with the stator such that an outer surface of the frame is identical to the outer surface of the stator or a frame disposed outside the stator; and
   at least one fastenerless cover fixed to the outer surface of the frame without the use of fasteners, the fastenerless cover having an arc shape extending in a first direction from a first edge to a second edge, the first and second edges extending parallel to the axis of rotation, such that the arc shape has a concavity in a second direction extending perpendicular to the axis of rotation, the fastenerless cover comprising a plurality of substantially flat sections joined by discrete bends, the substantially flat sections and discrete bends parallel with the axis of rotation, the plurality of flat sections including a mid-segment of a comparatively smaller width than a pair of adjacent segments when fixed to the outer surface of the frame,
   wherein the outer surface of the frame includes a plurality of fins, wherein an individual fin of the plurality of fins makes direct contact with the fastenerless cover and at least one fin proximate to the first edge does not contact the fastenerless cover.

2. The electric machine of claim 1, wherein the electric machine is an electric motor.

3. The electric machine of claim 1, wherein the stator further comprises a plurality of laminations.

4. The electric machine of claim 1, wherein the frame comprises at least one of cast iron, die-cast aluminum, extruded aluminum, or injection-molded plastic.

5. The electric machine of claim 1, wherein:
   each of the at least one fastenerless covers comprises:
   a sheet of material, the sheet comprising:
   a length in the direction of the axis of rotation; and
   first and second lips along the first and second edges, respectively, each lip configured to engage a respective complementary frame hook disposed on the outer surface of the stator to fix the fastenerless cover to the outer surface of the stator,
   wherein the sheet is at least partially elastically deformable in the first direction, allowing the separation between the first and second edges to be temporarily increased or decreased while fixing the fastenerless cover onto the frame, and
   wherein a restoring force of the deformed sheet secures, without the use of fasteners, the cover on the outer surface of the stator.

6. The electric machine of claim 1, wherein the cover further comprises mirror symmetry about a centerline of the sheet.

7. A fastenerless cover for covering a portion of an outer surface of a frame of an electric motor comprising a plurality of fins, the cover comprising:
   a sheet of material, the sheet comprising:
   an arc shape extending in a first direction from a first edge to a second edge and having a concavity in a second direction extending through an axis of rotation of the electric motor, the first and second edges substantially parallel to the axis of rotation, the first direction, the second direction, and the axis of rotation being mutually orthogonal;
   a length in the direction of the axis of rotation;
   the arc shape of the sheet of material comprising a plurality of substantially flat sections joined by discrete bends in the sheet, each discrete bend substantially parallel to the axis of rotation, the flat sections including a mid-segment of a comparatively smaller width than a pair of adjacent segments
   and
   first and second lips along the first and second edges, respectively, each lip configured to engage a respective complementary frame hook disposed on the outer surface of the stator to fix the fastenerless cover to the outer surface of the stator;
   the sheet being at least partially elastically deformable in the first direction, allowing the separation between the first and second edges to be temporarily increased or decreased while fixing the fastenerless cover onto the frame, wherein a restoring force of the deformed sheet secures, without the use of fasteners, the cover on the outer surface of the frame such that an individual fin of the plurality of fins makes direct contact with the fastenerless cover and that at least one fin proximate to the first edge does not contact the fastenerless cover.

8. The fastenerless cover of claim 7, wherein the material comprises at least one of a metal, a plastic, or a composite material.

9. The fastenerless cover of claim 7, further comprising one or more pieces in the direction of the axis of rotation and/or in an arc-wise direction.

10. The fastenerless cover of claim 7, wherein the sheet except the first and second edges is edged with a sealant.

11. The fastenerless cover of claim 7, wherein the sheet may be sufficiently deformed manually to secure the cover on the outer surface of the frame.

12. The fastenerless cover of claim 7, further comprising mirror symmetry about a centerline of the sheet.

13. The fastenerless cover of claim 12, wherein each discrete bend is configured to correspond to a fin on the outer surface of the frame.

14. The fastenerless cover of claim 7, wherein the arc-shaped sheet subtends an angle measuring 90° or less.

15. The fastenerless cover of claim 14, wherein the angle measures between 80° and 90°.

16. The fastenerless cover of claim 15, wherein the angle measures 84°.

17. The fastenerless cover of claim 14, wherein the centerline of the sheet is configured to align with a corner of the outer surface of the frame.

18. The fastenerless cover of claim 7, wherein the fastenerless cover is repeatably removable.

* * * * *